Figure 1:
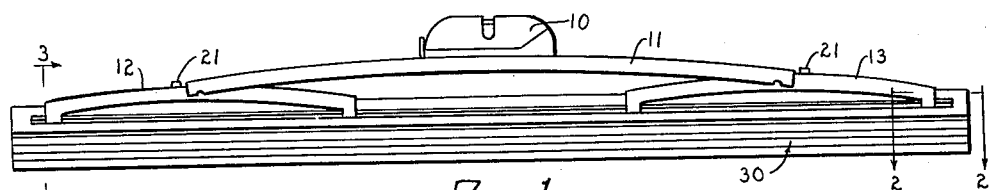

July 3, 1962  J. W. ANDERSON  3,041,654
WINDSHIELD WIPER BLADE
Filed March 25, 1957

INVENTOR.
JOHN W. ANDERSON
BY Redrow & Recktenwald
ATTORNEYS

:::
United States Patent Office 3,041,654
Patented July 3, 1962

3,041,654
WINDSHIELD WIPER BLADE
John W. Anderson, 578 Broadway, Gary, Ind.
Filed Mar. 25, 1957, Ser. No. 648,270
18 Claims. (Cl. 15—250.42)

This invention relates to windshield cleaning means and more particularly to an improved form of a windshield wiping blade.

Just prior to the introduction of curved glass windshields in automobiles, a new type of wiper blade was invented which played a large part in making it possible to satisfactorily use such windshields. Because of the improved wiping action obtained, the blade met with immediate commercial success and was universally adopted to the cleaning of curved glass windshields upon their introduction by the auto industry. This blade includes a pressure-distributing system for applying the wiper arm pressure to the wiping blade through a flexor means that is freely resilient when moved in a direction toward or away from the surface to be cleaned, but substantially rigid against flexing in a plane generally parallel to that surface. When using this combination of elements, a predetermined proportion of pressure is produced at points along the wiping edge whereby the blade is made to conform more readily to the normally irregular surface of a windshield being wiped.

In a common commercial form of this prior art invention, the wiper arm is connected to the center point of a primary bridge element and the ends of the bridge are pivotally connected to secondary yoke means. The secondary yokes in turn are connected at spaced points along a freely flexible flat flexor means, so that the pressure from the primary bridge is distributed through the secondary yokes to the several pressure points along the flexor where the secondary yokes are operatively connected to the flexor.

In the most common adaptation of this form of wiper blade, the flexor has taken the form of a flat resilient metal means which is resilient in a direction toward and away from the windshield to conform to the contour of the curved glass being wiped, but which is substantially rigid in a direction parallel to the surface of the glass so that the pressure of the wiper arm can be distributed through the bridge and yoke system to the flexor. The flexor thus stiffens the rubber wiping element laterally, but flexes with the rubber toward and away from the surface being wiped so that the wiping means conforms to the curvature of the glass and yet is substantially rigid against lateral or sidewise deformation as the arm is driven back and forth across the glass surface.

Various modifications within the scope of this basic development, claiming to be improvements, have been manufactured, but none have seemed, in service, to perform desirably under all conditions. The present invention has as its purpose the introduction of new structure providing advantages in performance. Simply stated, the present invention includes spacer means associated with the flexors to simplify the manufacturing process and assembly of the parts, simplify the servicing of such blades in use, and to reduce the effort required to conform the rubber wiping means to the curvature of the glass. This is done preferably by placing a plastic strip, in the form of an antifriction bearing means, between the flexors and the rubber wiping element with which they are associated. In following this teaching, the force required to flex the blade into substantially conforming relationship with respect to the surface of the glass is reduced and thus improved wiping actions are obtained by making available more of the pressure transmitted to the blade from the arm for holding the blade against the glass rather than dissipating a portion of this pressure in frictional losses between the flexor and the rubber wiping element.

Figure 7:
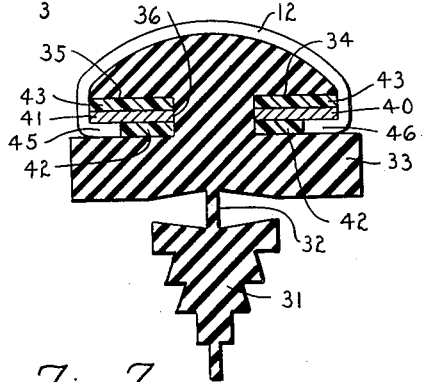
Figure 2:
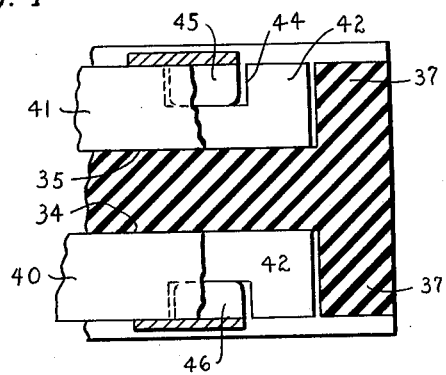
Figure 3:
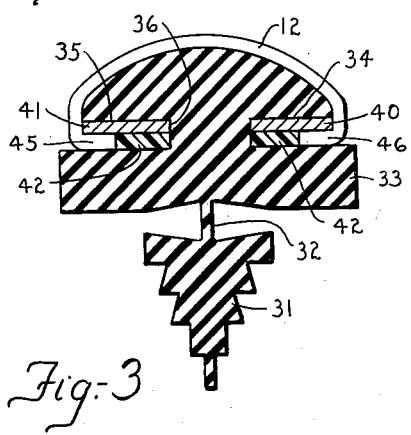
Figure 6:
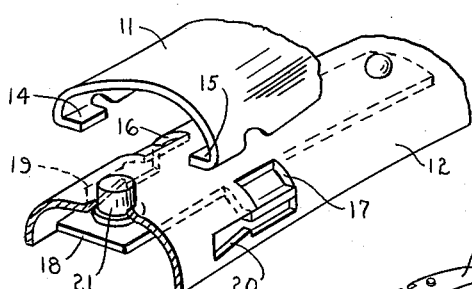
Figure 5:
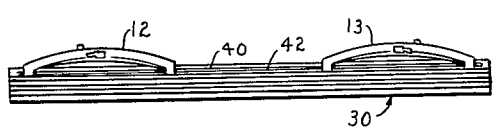
Figure 4:
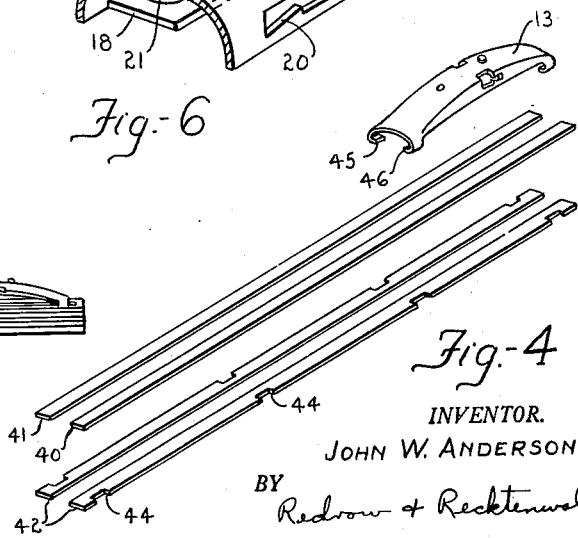

The preferred form of the invention is shown in the drawings, wherein:

FIGURE 1 is a side elevation of the invention;
FIGURE 2 is a view taken on line 2—2 of FIGURE 1 with the flexor elements partly broken away;
FIGURE 3 is a cross-sectional view taken on line 3—3 of FIGURE 1 showing one form of this invention;
FIGURE 4 is an exploded view showing the composite flexor arrangement disclosed in FIGURE 3;
FIGURE 5 is a side elevation of a subassembly of the complete wiper blade shown in FIGURE 1, the subassembly having utility itself as a replacement service part;
FIGURE 6 is a perspective view showing the connecting arrangement provided between the primary bridge and the secondary yokes; and
FIGURE 7 is a view similar to FIGURE 3 showing another form of this invention.

The blade of this invention includes all of the elements of the basic invention described above including a wiping element, the flexor means and a pressure-applying yoke system cooperating with the flexor and wiping means. Thus, as is well known, the usual wiper drive arm positioned in front of an automobile windshield is adapted to be connected to a connector 10 to transmit a driving motion and wiping pressure to a primary bridge element 11. The primary bridge is adapted to be detachably connected to the secondary yokes 12 and 13 by the releasable connection disclosed in my copending application Serial No. 609,631 filed September 13, 1956, now Patent No. 2,955,313. This structure takes the form which is best seen in FIGURE 6 wherein each of the ends of the primary bridge 11 is provided with a pair of inwardly turned claws 14 and 15 which are adapted to straddle each of the secondary yokes 12 and 13 to pass downwardly into apertures 16 and 17 provided in the upper surface at approximately the center point of the respective secondary yokes. The claws 14 and 15 are forced downwardly in the apertures 16 and 17 against the pressure of the laterally extending portions of spring 18 disposed in apertures 16 and 17 until the spring is forced to the bottom of the apertures, whereupon the claws 14 and 15 may be slid longitudinally into slots 19 and 20 which communicate with apertures 16 and 17 respectively, the slots being formed in the side walls of the secondary yoke 12. As soon as the claws pass into slots 19 and 20, the lateral extensions of spring 18 snap up into position in apertures 16 and 17 behind claws 14 and 15 to prevent their accidental displacement from their assembled position. When, however, it is necessary to replace the wiping element, the connecting process is reversed and, therefore, a suitable button 21 is operatively associated with the free end of spring 18 whereby the button may be depressed so that the laterally extending portions of the spring may be depressed so that claws 14 and 15 may be returned from slots 19 and 20 to apertures 16 and 17 to effect separation of the primary bridge and secondary yoke. Both ends of the primary bridge may be detachably connected to their respective secondary yokes in this manner.

The secondary yokes are in turn adapted to be connected to the wiping element 30 through the flexor means whereby the driving force and pressure-applying action of the above-described yoke system will be delivered to the wiping element to drive it across the windshield. The wiping element has a body including the wiping edge 31 which is hinged to the attaching portion by the thin web 32. The attaching portion 33 is adapted to be operatively connected to the flexor means and in the form of the invention here shown, the attaching portion of the body is adapted to extend beyond the outer edges of the secondary yoke means so that when the blade is driven back and forth across the glass, the metal elements of the yoke system are precluded from wiping on the windshield surface such that it might be scratched.

The attaching portion of the elongate wiping element 30 is provided with grooves 34 and 35 formed longitudinally along each side, the grooves being separated by the center wall 36 and having closed ends as best shown at 37 in FIGURE 2. The upper surface of the attaching portion 33 is shaped to completely fill the space within the end portions of the secondary yokes 12 and 13 as is clearly shown in FIGURES 3 and 7 whereby upon completion of the assembly a firm, but movable, connection is provided between the ends of the secondary yokes and the wiping element.

Positioned within the grooves 34 and 35 are the flexor means for receiving the arm pressure and driving forces from the yoke system which serves to distribute these forces to the wiping element. The flexor means is designed to be substantially uniformly flexible throughout its length in at least the direction toward and away from the windshield so that the pressure from the bridge and yoke system delivered to the wiper element will effect efficient cleaning, and preferably the flexor element is made to be substantially rigid in a lateral direction so that stiffness is imparted to the blade by the flexor means as it is driven back and forth across the glass. In order to produce the greatest possible flexibility in the wiping element limited only by the nature of the materials of the flexor means and wiper element themselves, the present invention incorporates antifriction means in the flexor means so that the wiping element can be more readily conformed to the surface to be wiped by the pressure produced upon the flexor means by the bridge and yoke means with a maximum application of wiping force to the windshield and a minimum frictional resistance or loss within the blade itself due to the flexing action which takes place during operation of the wiper.

To accomplish this, the resilient elements 40 and 41 of the flexor means are positioned within the grooves 34 and 35, the resilient elements being preferably formed of a flat striplike piece of resilient metal. The flatwise disposition of the resilient elements 40 and 41 disposes them relative to the wiping edge 31 such that the wiping edge is backed up by a uniformly resilient strip that is readily deformable in a direction toward and away from the surface to be cleaned so that the wiping edge may be made to conform to curvatures of a surface against which it is pressed. It will be noted, however, that the flat elements are disposed within the grooves 34 and 35 in a manner to make the wiping element relatively rigid against flexing when subjected to forces directed against the wiping element from the side.

The resilient elements 40 and 41 are, as shown in the preferred form of the invention depicted in FIGURE 3, separated from the bottom walls of grooves 34 and 35 by spacer elements 42. These spacer elements are preferably formed of a hard plastic and in addition to their spacing function may be made to provide an antifriction bearing surface. When this is done, the blade will flex more easily as is required in conforming to an irregular surface to be wiped and very little, if any, energy is lost because of friction which would otherwise be present when the different layers of the attaching portion of the wiping element slide relative to the flexor means during the flexing action inherent in the use of the wiper blade. It has been found that suitable antifriction bearing strips can be produced by using any relatively hard plastic material, but especially designed antifriction surfaces, such as may result from the use of nylon and Teflon, have been found to serve very well in this connection.

The flexors 40 and 41 and the antifriction elements 42 are all held in grooves 34 and 35 by the ends 37 and the secondary yokes 12 and 13 including the claws 45 and 46 integral with the ends of the secondary yokes. Referring to FIGURES 2 and 3, it is seen that the inner ends of the claws 45 and 46 engage under the resilient elements 40 and 41 and the ends of the claws fit into notches 44 of strips 42, the notches loosely engaging the claws as best shown in FIGURE 2. With this construction limited, relative movement may take place between the yokes 12 and 13 and the wiping element 30 as the wiping element flexes to accommodate itself to the curvature of the surface being wiped.

A modified form of the invention is shown in FIGURE 7 wherein additional spacer means 43 may be positioned in the grooves 34 and 35 above the resilient elements 40 and 41 if desired. By adding these spacers, the grooves can be made even wider and some small degree of frictional loss may be overcome by so positioning spacer 43 provided they are made of a material that will form an antifriction bearing.

The preferred form of the structure above described may be assembled by one of the several methods taught in my copending application Serial No. 648,148 filed concurrently herewith, now Patent No. 3,003,174, issued October 10, 1961. Preferably, however, the device is assembled by placing the secondary yokes 12 and 13 in position on the wiping element 30 with one of the resilient elements such as 40 loosely trapped in position in one of the grooves, such as the groove 34, by the claws 46 of yokes 12 and 13. The yokes are then both moved to one end of the wiping element 30 and the resilient metal element 41 may be slipped lengthwise of the other groove 35 into position to be trapped in that groove by the claws 45 on the other side of the secondary yokes 12 and 13. Thereafter, the yokes are moved to their normal positions at the opposite ends on element 30. Spacer means 42 are then pushed into position by being forced into their respective slots under the ends of claws 45 and 46 until they butt against wall 36 and then the claws are snapped into position in the notches 44 provided in the spacer means 42, to complete the assembly of the secondary yokes on the wiping means as shown in FIGURE 5.

The wiping element 30, together with the assembled flexor means including the resilient elements and spacer elements as well as the secondary yokes 12 and 13, produce a subassembly, such as is shown in FIGURE 5. This subassembly may be used as a refill element to replace worn wiping elements on wiping blades already in use. In other instances, the subassembly may be connected to a bridge 11, as explained above, by means of the releasable connecting means shown in FIGURE 6 to produce a complete blade structure.

When the subassembly is used for refill purposes in the servicing of wiper mechanisms, the refill is quickly attached by connecting the ends of the primary bridge into the midpoint connection means provided on each of the secondary yokes. Thus, by making two very simple connections, the refill is mounted on the wiper arm, whereas in the past, somewhat more complicated manipulations have been involved. In the past, also, connections were thought to have been completed whereas in fact they were not and the glass windshield was scratched. Since the present refill may be so easily connected, this difficulty of the prior art is substantially eliminated.

In the preferred form of the invention, the spacer means 42 takes the form of an antifriction bearing element. In some instances, however, the use of a mere spacer element has been found desirable in order to fill the slots 34 and 35. These slots are normally produced during a rubber-molding operation, and when a very thin web is incorporated in the mold to produce a slot just wide enough for the resilient elements 40 and 41, the web frequently breaks and relatively high tool maintenance costs are encountered. By introducing the spacer element 42 into the assembly, wider grooves such as 34 and 35 result, whereby a thicker web may be provided in the rubber mold and these high maintenance costs in rubber molding may be eliminated.

In the instance where a subassembly is to be marketed as a refill element, the spacer means 42 serves the additional function of holding the secondary yokes 12 and 13 properly positioned to be readily attached to the standard bridge structure 11. This, of course, is likewise of incidental advantage in the factory assembly of the complete blade.

While the above description covers the preferred form of this invention, it is to be understood that modifications thereof may occur to those skilled in the art which will fall within the scope of the following claims.

I claim:

1. In a windshield wiper blade assembly, an elongate flexible wiper means, a pressure-applying holder, resilient elongate flexor means adapted to cooperate with said wiper means, said flexor means being operatively connected at longitudinally spaced-apart points to said holder to receive pressure therefrom, and relatively friction-free bearing means for supporting said flexor means for slight longitudinal movement relative to said wiper means.

2. In a windshield wiper blade assembly, an elongate flexible wiper means, a pressure-applying holder, resilient elongate flexor means adapted to cooperate throughout its length with said wiper means, said flexor means being operatively connected to said holder at more than two points approximately evenly spaced lengthwise along said flexor means to receive pressure from said holder, and elongate relatively friction-free bearing means substantially coextensive lengthwise with said flexor means for supporting said flexor means for slight longitudinal movement relative to said wiper means.

3. In a windshield wiper blade assembly, an elongate flexible wiper means, a pressure-applying holder including a primary bridge adapted to be connected to a wiper arm and associated secondary yokes connected to said bridge, resilient elongate flexor means adapted to cooperate throughout the length thereof with said wiper means, said flexor means being operatively connected adjacent the ends thereof and at least one intermediate point to said yokes of said holder to receive pressure therefrom, and elongate relatively friction-free bearing means substantially coextensive lengthwise with said flexor means for supporting said flexor means for slight longitudinal movement relative to said wiper means.

4. In a windshield wiper blade assembly, an elongate flexible wiper means, relatively uniformly resilient elongate metal means embedded in said wiper means to receive pressure and operatively engage said wiper means with a windshield, and elongate antifriction bearing means coextensive with and positioned to coact between said metal means and wiper means.

5. In a windshield wiper blade assembly, an elongate flexible wiper means, means to support said wiper means for movement over a windshield surface and adapted to press said wiper means against said surface, a pair of relatively uniformly resilient elongate metal members adapted to receive pressure from said second-mentioned means, said wiper means having a pair of longitudinally extending grooves therein and said members being positioned respectively in said grooves to operatively engage and press said wiper means against said surface, and a pair of elongate antifriction bearing means operatively positioned in said grooves to coact between said members and wiper means to minimize frictional losses produced when the metal members move relative to said wiper means as it moves over said surface.

6. In a windshield wiper blade assembly, an elongate flexible wiper means, means to support said wiper means for movement over a windshield surface and adapted to press said wiper means against said surface, a pair of relatively uniformly resilient elongate flat metal members adapted to receive pressure from said second-mentioned means, said wiper means having a pair of longitudinally extending grooves therein and said members being positioned respectively in said grooves to operatively engage and press said wiper means against said surface, and a pair of elongate antifriction bearing means of approximately the same size as said members and operatively positioned in said grooves to coact between said members and wiper means to minimize frictional losses produced when the metal members move relative to said wiper means as it moves over said surface.

7. In a windshield wiper blade assembly, an elongate flexible wiper means, means to support said wiper means for movement over a windshield surface and adapted to press said wiper means against said surface, a pair of relatively uniformly resilient elongate flat metal members adapted to receive pressure from said second-mentioned means, said wiper means having a pair of longitudinally extending grooves therein and said members being positioned respectively in said grooves to operatively engage and press said wiper means against said surface, and a pair of elongate antifriction bearing means of approximately the same size as said members and positioned in the grooves between the members and said surface.

8. In a windshield wiper blade assembly, an elongate flexible wiper means, means adapted for connection to a spring-urged wiper arm to move said wiper means over a windshield surface and adapted to transmit pressure of said arm to said wiper means to press said wiper means against said surface, a pair of relatively uniformly resilient elongate flat metal members adapted to receive pressure from said second-mentioned means, said wiper means having a pair of longitudinally extending grooves therein and said members being positioned respectively in said grooves to operatively engage and press said wiper means against said surface, and a pair of elongate antifriction bearing means of approximately the same size as said members for each one of said pair of members, one of said pair of bearing means being disposed on each side of each of said members disposed in their respective grooves.

9. A windshield cleaner having an elongate flexible wiping means, a holder to apply pressure in a direction to engage said cleaner on a windshield to be cleaned, a resilient flexor means operatively connected to said holder to receive the pressure and cause said wiping means to engage the windshield substantially uniformly throughout its length, said wiping means having a body formed with a wiping edge and an attaching portion, said attaching portion of said body being provided with flexor-receiving seat means, said flexor means being carried in said seat means, and antifriction bearing means carried in the seat means to cooperate between the flexor means and the attaching portion of the wiping means.

10. A windshield cleaner having an elongate flexible wiping means, a holder to apply pressure in a direction to engage said cleaner on a windshield to be cleaned, a resilient flexor means operatively connected to said holder to receive the pressure and cause said wiping means to engage the windshield substantially uniformly throughout its length, said wiping means having a body formed with a wiping edge and an attaching portion, said attaching portion of said body being provided with oppositely disposed grooves, said flexor means being carried in said grooves, and antifriction bearing means carried in the grooves on at least one side of said flexor means to cooperate between the flexor means and the attaching portion of the wiping means in a manner to substantially eliminate friction between the flexor means and the body during the flexing thereof.

11. A windshield cleaner having an elongate flexible wiping means, a holder to apply pressure in a direction to engage said cleaner on a windshield to be cleaned, a pair of flat elongate resilient flexors operatively connected to said holder to receive the pressure and cause said wiping means to engage the windshield substantially uniformly throughout its length, said wiping means having a body formed with a wiping edge and an attaching portion, said attaching portion of said body being provided with oppositely disposed grooves, said flexors being carried in said grooves respectively, and a pair of elongate flat antifriction bearing elements carried in the grooves between the flexor and the windshield to cooperate between the flexor means and the attaching portion of the wiping means.

12. A windshield cleaner having an elongate flexible wiping means, a holder including a primary bridge adapted to be connected to a pressure-producing wiper arm and secondary yoke means positioned between the bridge and wiping means to apply pressure in a direction to engage said cleaner on a windshield to be cleaned, a pair of elongate flat resilient flexors operatively connected to the secondary yokes of said holder to receive the pressure and cause said wiping means to engage the windshield substantially uniformly throughout its length, said secondary yokes having claw elements to cooperate with and guide said flexors, said wiping means having a body formed with a wiping edge and an attaching portion, said attaching portion of said body being provided with oppositely disposed generally rectangularly shaped grooves, said flexors being carried one in each of said grooves, such that they lie flatwise therein respectively and generally parallel to the surface of the windshield, and a pair of elongate flat antifriction bearing means carried in the grooves to cooperate between the flexors and the attaching portion of the wiping means, said flexors and said bearing means being held positioned in said grooves by the claw elements of said yokes.

13. A windshield cleaner having an elongate flexible wiping means, a holder including a primary bridge adapted to be connected to a pressure-producing wiper arm and secondary yoke means positioned between the bridge and wiping means to apply pressure in a direction to engage said cleaner on a windshield to be cleaned, a pair of elongate flat resilient flexors operatively connected to the secondary yokes of said holder to receive the pressure and cause said wiping means to engage the windshield substantially uniformly throughout its length, said secondary yokes having claw elements to cooperate with and guide said flexors, said wiping means having a body formed with a wiping edge and an attaching portion, said attaching portion of said body being provided with oppositely disposed generally rectangularly shaped closed-end grooves, said flexors being carried one in each of said grooves, such that they lie flatwise therein respectively and generally parallel to the surface of the windshield, and a pair of elongate flat antifriction bearing means carried in the grooves to cooperate between both sides of each of the flexors and the attaching portion of the wiping means, said flexors and said bearing means being held positioned in said grooves by the claw elements of said yokes.

14. A windshield cleaner having an elongate flexible wiping means, a holder including a primary bridge adapted to be connected to a pressure-producing wiper arm and secondary yoke means positioned between the bridge and wiping means to apply pressure in a direction to engage said cleaner on a windshield to be cleaned, a pair of elongate flat resilient flexor means operatively connected to the secondary yokes of said holder to receive the pressure and cause said wiping means to engage the windshield substantially uniformly throughout its length, said secondary yokes having inturned claw elements, said wiping means having a body formed with a wiping edge and an attaching portion, said attaching portion of said body being provided with oppositely disposed generally rectangularly shaped closed-end grooves, said flexors being carried one in each of said grooves, such that they lie flatwise therein respectively and generally parallel to the surface of the windshield, and a pair of elongate flat antifriction bearing elements carried one in each of the grooves to cooperate between the flexors, said antifriction elements being disposed in said grooves between the flexors and the windshield, said claw elements of the secondary yokes extending around the attaching portion of said wiping means and into said grooves, said flexors being nested in the grooves so that their flatwise dimension is disposed generally parallel to the windshield, said antifriction elements being notched to loosely receive the ends of the claw elements whereby the bearing elements are held in the grooves in assembled relation with the flexors.

15. In a windshield wiper blade assembly, a resilient wiping element having a back portion and a wiping portion opposed thereto and adapted to contact and wipe a curved surface of a windshield or the like, a longitudinally disposed portion of said element having a bearing surface lying remote from said wiping portion and lying generally parallel to the surface to be wiped and facing away therefrom, an elongate freely and resiliently flexible member disposed adjacent said bearing surface and adapted to receive and transmit to said element, at spaced-apart portions thereon, wiper arm pressure through an assembly for the distribution thereof, and means lying between said flexible member and said bearing surface to facilitate relative longitudinal movement therebetween during flexing of said assembly and the conformity of the wiping portion thereof to the surface to be wiped.

16. In a windshield wiper blade assembly, a wiping element, an elongate freely and resiliently flexible support means carried thereby, and second means disposed and retained between and contacting said support means and said element to hold said support means substantially out of frictional contact with said element to facilitate relative longitudinal movement therebetween during flexing of said assembly toward conformity with a windshield.

17. In a windshield wiper blade assembly, a resilient wiping element having a portion adapted to contact and wipe an irregularly or variably curved surface of a windshield or the like, said element being provided with a bearing surface lying remote from said wiping portion, an elongate freely and resiliently flexible member disposed adjacent said bearing surface and adapted to receive, at spaced-apart portions thereon, wiper arm pressure from an assembly for the distribution thereof, and means interposed between said flexible member and said bearing surface, to facilitate relative longitudinal movement therebetween and conformity of the wiping portion to the surface to be wiped.

18. In a windshield wiper blade assembly, a resilient wiping element having a portion adapted to contact and wipe a curved surface of a windshield or the like, a longitudinally disposed portion of said wiping element having a surface lying remote from the contacting portion of said wiping element, an elongate freely and resiliently flexible member disposed adjacent said surface, and means between said flexible member and said surface for reducing the frictional resistance to relative longitudinal movement between said flexible member and said element.

References Cited in the file of this patent

UNITED STATES PATENTS

| | | |
|---|---|---|
| 1,461,130 | Longhead | July 10, 1923 |
| 2,596,063 | Anderson | May 6, 1952 |
| 2,663,043 | Oishei | Dec. 22, 1953 |
| 2,672,641 | Scinta et al. | Mar. 23, 1954 |
| 2,782,495 | Beck et al. | Feb. 26, 1957 |